United States Patent [19]

Spalla

[11] Patent Number: 4,897,987

[45] Date of Patent: Feb. 6, 1990

[54] MULTIPURPOSE AND SELF-MOVING ARGICULTURAL MACHINE

[76] Inventor: Pier L. Spalla, Via Santa Maria, 29, I-15032 Borgo San Martino (Alessandria), Italy

[21] Appl. No.: 367,089

[22] Filed: Jun. 16, 1989

[30] Foreign Application Priority Data

Jun. 17, 1988 [IT] Italy ................................ 21002 A/88

[51] Int. Cl.⁴ ............................................. A01C 23/00
[52] U.S. Cl. ................................ 56/16.7; 56/DIG. 11
[58] Field of Search ....................... 56/16.7, 16.9, 14.7, 56/208, 210, 211-217, DIG. 11, 10.1; 280/6.12, 490.1, 491.1

[56] References Cited

U.S. PATENT DOCUMENTS

| | | | |
|---|---|---|---|
| 2,566,144 | 8/1951 | Ross | 56/DIG. 11 X |
| 2,665,920 | 1/1954 | White, Jr. | 56/DIG. 11 X |
| 3,921,374 | 11/1975 | Mizzi | 56/210 X |
| 3,946,681 | 3/1976 | Sylvester | 56/16.7 X |

Primary Examiner—Thuy M. Bui
Attorney, Agent, or Firm—Browdy & Neimark

[57] ABSTRACT

A multipurpose and self-moving agricultural machine is provided comprising: mobile bearing member (3, 4), a frame (2) borne by the mobile bearing members (3, 4), a main engine (7) borne by a frame (2) and operating at least on the mobile bearing members (3, 4), an operation and driving place (26) supported by the frame (2), engagement members (2a), suitable to support the main engine (7) alternatively in an upper position, placed above the frame (2), and in a lower position, beside the mobile support members (3, 4), and driving members (16) extending between the main engine (7) and the mobile bearing members (3, 4) and adaptable to both the upper and lower positions of the main engine (7).

15 Claims, 5 Drawing Sheets

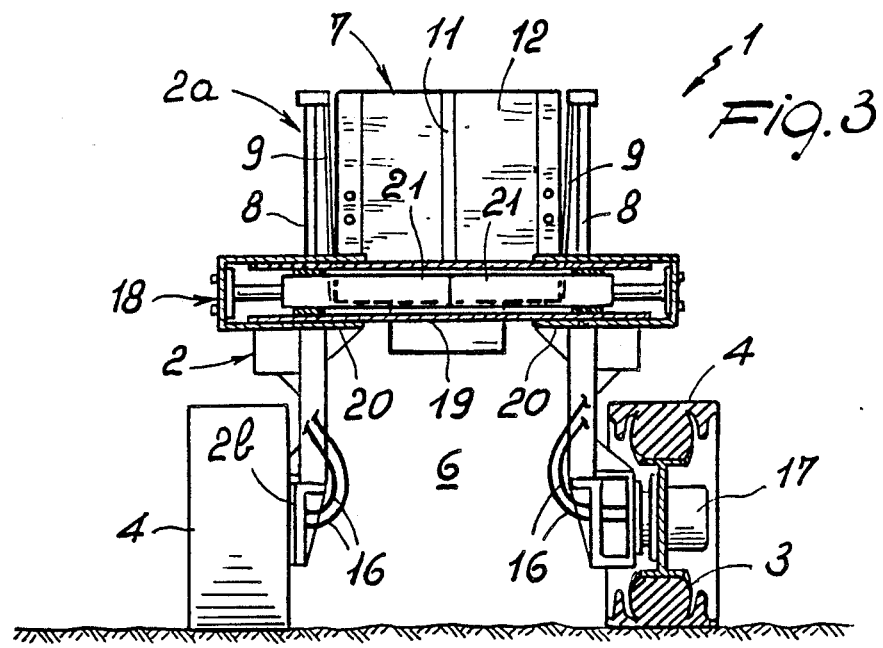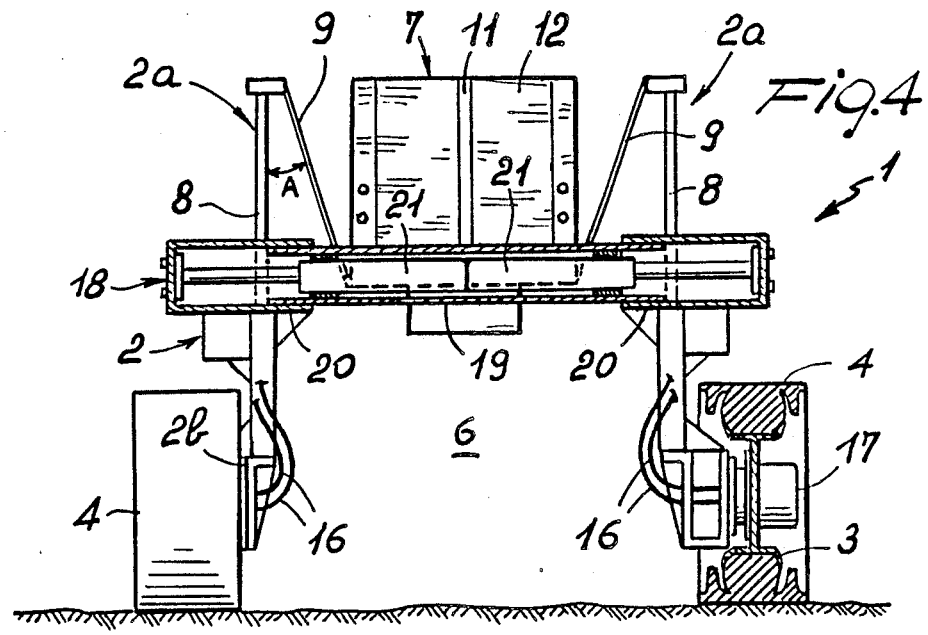

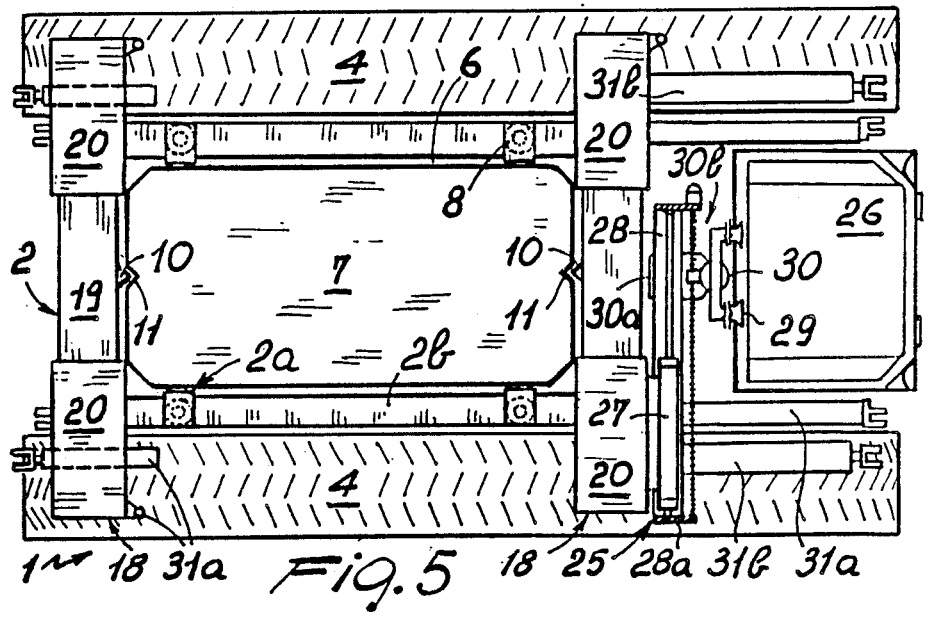
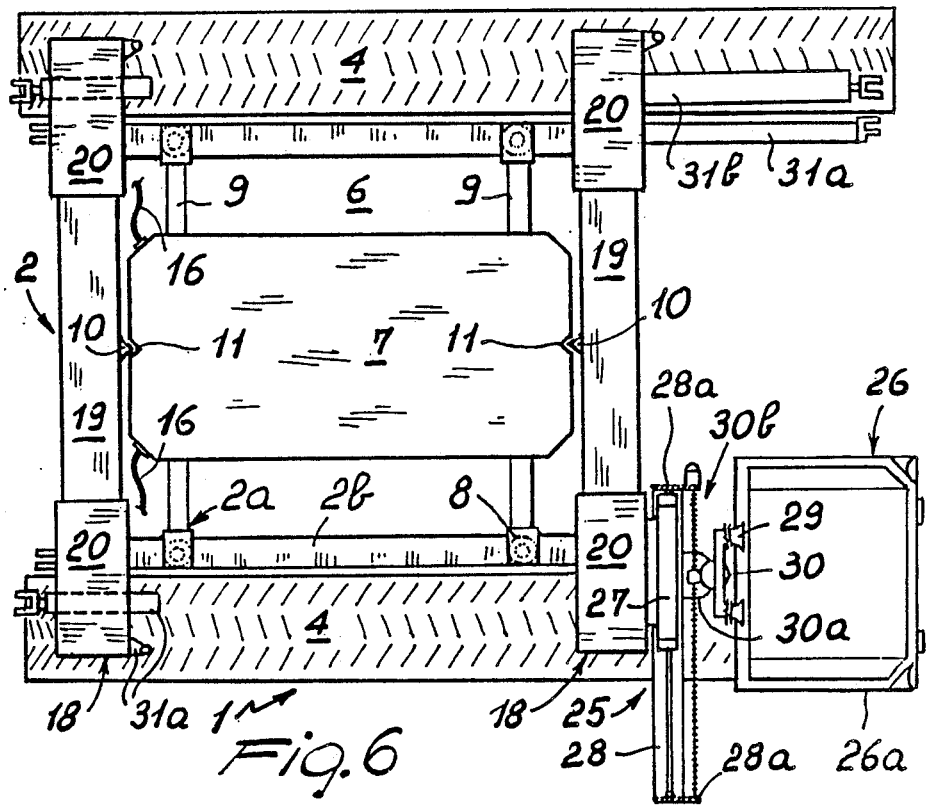

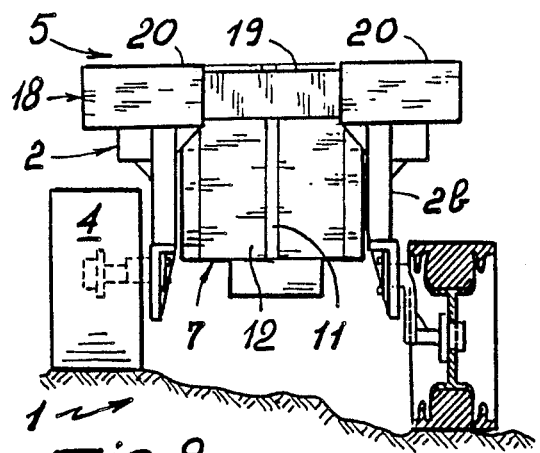
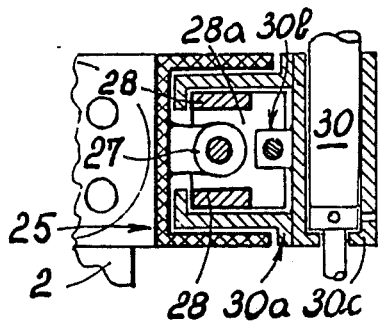
Fig. 8
Fig. 7a
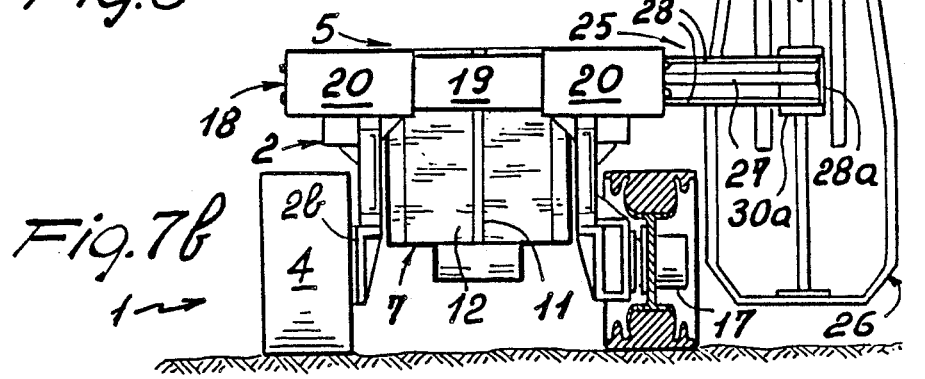
Fig. 7b
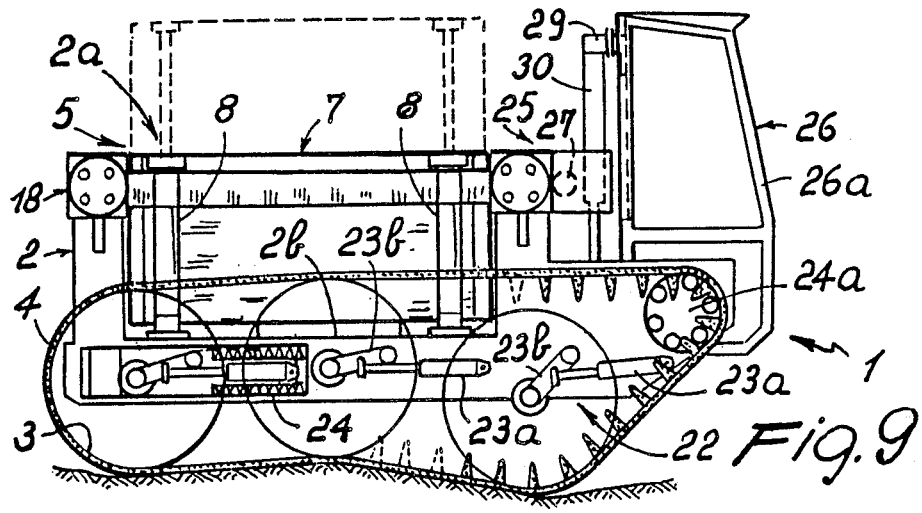
Fig. 9

MULTIPURPOSE AND SELF-MOVING ARGICULTURAL MACHINE

BACKGROUND OF THE INVENTION

This invention relates to a multipurpose and self-moving agricultural machine, for the performance of a plurality of operations. As it is known, various types of agricultural machines are already available at present for the performance of different jobs. Notwithstanding the variety of available machines, for agricultural use, is tipical in all the machines of known type the lack of a large free upper surface, at a moderate elevation, whereon different operations may be carried out without any impediment, due to the presence of the engine or of the driving place or of other mechanical parts, for which operations a really large operative space turns out to be necessary.

The achievement of this requirement could be obtained only by machines without self-means of locomotion, that is not self-moving, and therefore not autonomous, or by self-moving machines in which the engine is located in a very low position and very close to the ground. In the latter case a strong limitation in the use of the machine would result in that it would not be possible for it to ride over cultivations that must not be squashed, e.g., in the horticultural field, asparagus, egg plants, red peppers, melons and similar. Besides, the above-supposed machines would not allow the use of longitudinal and central belt conveyors, at low and very low elevation, for the collection of horticultural products straight from the ground. Besides, it must be pointed out that the agricultural machines of known type, if they are of the type with very high engine and such a structure as to allow them to ride over strips of cultivated land, still do not allow them to be adapted to the cross-dimension of the strip itself and turn out therefore to be limited in their use to fixed operative widths corresponding to the clearance between the wheels or the tracks.

Another drawback that can be found in the known agricultural machines of a known type is in any case their reduced suitability to the differences in elevation and to the steepnesses that can be found in many hill or mountain grounds. Such differences in elevation and steepnesses make it practically impossible to perform operations for which bearing planes or belt conveyors are necessary that have a tilt not higher than determined proper values, for a correct moving of the harvested products.

Another drawback is the reduced visibility in the driving and operating position. That is, the operator can not always follow the operation of every operating structure associated to the agricultural machines from his working place with the due care and comfort.

SUMMARY OF THE INVENTION

In this situation the technical task of the present invention is to provide a self-moving and multipurpose agricultural machine able to bring a substantial remedy to the above-mentioned inadequacies. The specified technical task is substantially resolved by a multipurpose self-moving agricultural machines, comprising:
mobile bearing members, defining a direction of movement of said machine,
a frame borne by said mobile bearing members and having a transversal direction extending transversally to said direction of movement, and a longitudinal direction perpendicular to said transversal direction,
a main engine borne by said frame and acting at least on said mobile bearing members,
a plurality of engaging means provided on said frame and suitable to engage operative structures for agricultural works,
and an operation and driving place borne by said frame;
characterized in that said frame includes engagement means suitable to bear said main engine alternatively in an upper position, said upper position being substantially above said frame, and in a lower position, said lower position being substantially beside said mobile bearing members,
driving members being provided between said main engine and said mobile bearing members, said driving members being adaptable for both said upper and lower positions of said main engine.

BRIEF DESCRIPTION OF THE DRAWINGS

Further features and advantages of the invention will appear from the following description of a few preferred embodiments of an agricultural machine according to the invention, given as an example and with reference to the attached drawings, in which:

FIG. 3 shows a rear view of the machine of FIG. 1, without cabin, in an arrangement of minimum clearance between the tracks;

FIG. 4 is similar to FIG. 3, but in an arrangement with maximum clearance between the tracks;

FIG. 5 is a top view of the machine in an arrangement of minimum clearance between the tracks and with the cabin in central position;

FIG. 6 is similar to FIG. 5, but in an arrangement of maximum clearance between the tracks and with the driving cabin in a partially laterally translated position;

FIG. 7a shows how the connection between the driving cabin and the frame is realized;

FIG. 7b is similar to FIG. 3 but with the engine in a lower position and the cabin in the position of maximum lateral shift;

FIG. 8 shows the machine of FIG. 7 provided with suspension members to keep the machine in an horizontal position;

FIG. 9 is a side view of the machine of FIG. 8;

DESCRIPTION OF THE PREFERRED EMBODIMENTS

Figure 1:
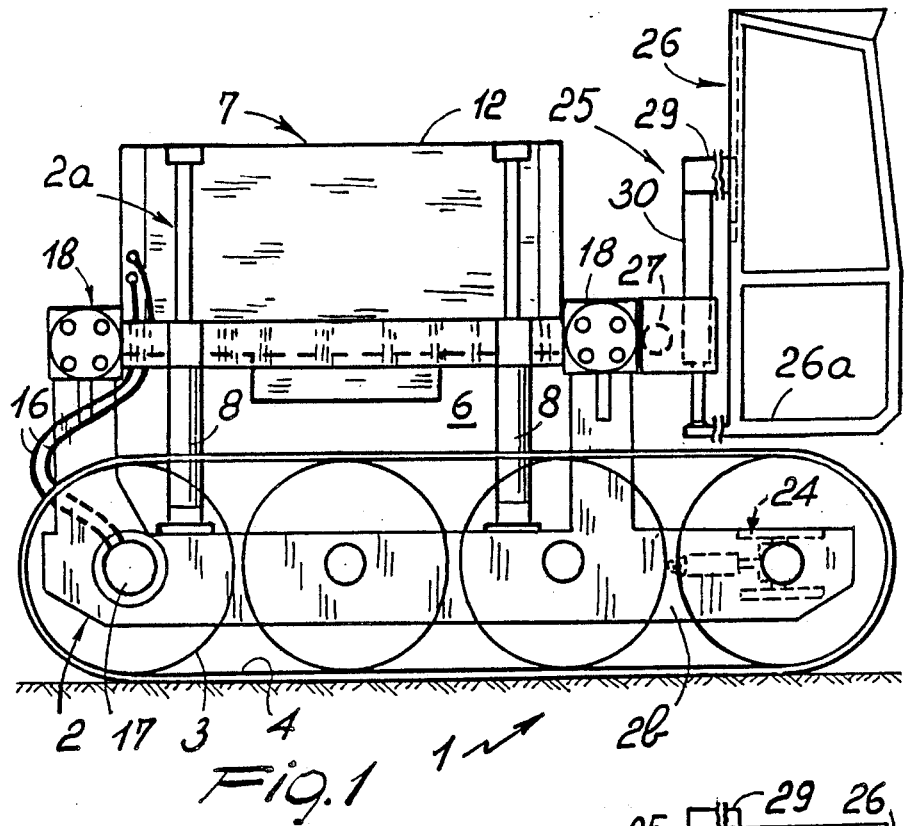
FIG. 1 shows a diagrammatic side view of the agricultural machine according to the invention, in its first embodiment, with the engine assembly in an upper position.
Figure 2:
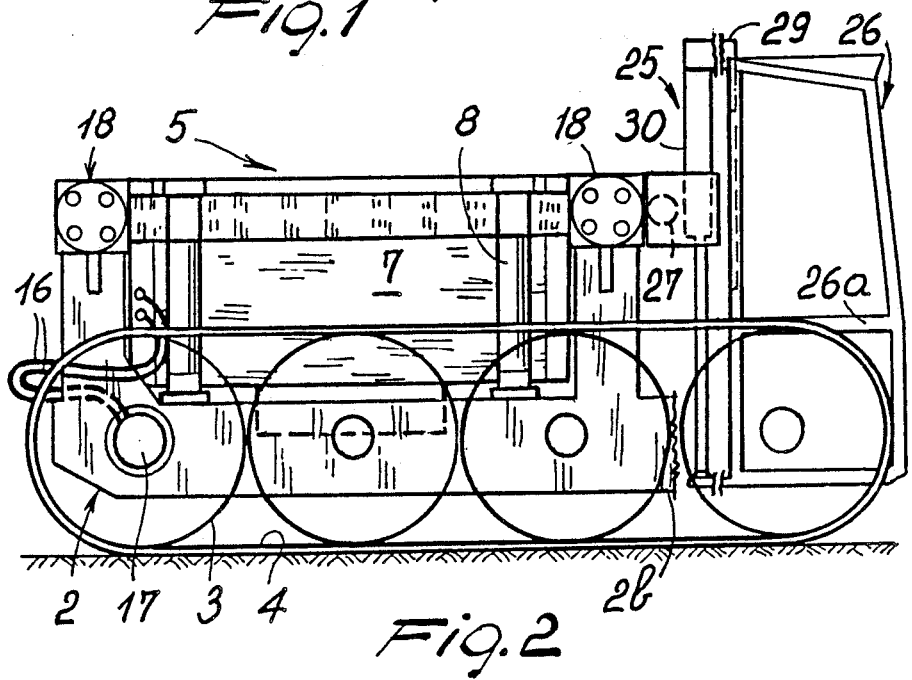
FIG. 2 is similar to FIG. 1, but with the engine in a lower position.

Referring to above Figures, the agricultural machine according to the invention is shown as a whole with numeral 1.

In an embodiment shown in FIGS. 1 to 9, it includes a frame 2 borne by bearing members, mobile on the ground, formed by wheels 3 and tracks 4. Frame 2 has a transversal direction extending transversally to the direction of movement of the machine, imposed by the mobile bearing members 3 and 4. Frame 2 has a prevailing longitudinal direction perpendicular to said transversal direction. Frame 2 has a shape substantially like an reversed U and defines both a holding plane 5 above tracks 4, favourably placed at an elevation of about 120 cm, and a channel-type hollow 6 between the tracks themselves, the hollow extending longitudinally between a front and rear end of the machine 1.

A main engine 7 can be engaged with the frame 2 in two different positions. In a first lower position, shown in FIG. 2, the main engine 7 is placed longitudinally within the channel-type hollow 6, so that the holding plane 5 is totally free.

In a second upper position shown in FIG. 1, the main engine 7 is substantially above the holding plane 5.

The main engine 7 is engaged with frame 2 by engagement means 2a in the above-mentioned upper and lower positions, said engagement means including four fluid-operated lifting cylinders 8 and relatively long flexible cables 9 connected on one side to the upper end of cylinders 8, and on the other side underneath the main engine 7.

It appears that the fluid-operated lifting cylinders 8 extend in height not over the maximum elevation of the main engine 7 and are supported by longitudinal portion 2b of the frame 2. These longitudinal portions 2b are parallel to said longitudinal direction and are engaged with the mobile bearing members 3, 4, in order to leave the channel-type hollow 6 free. Fixed guiding members are provided to guide the movements of the main engine 7, the guiding members extending vertically, and made up of lands 10 protruding from frame 2, and of corresponding grooves 11 on the main engine 7. The guiding members prevent transversal movements of the main engine 7 and are formed near an intermediate vertical plane, parallel to said longitudinal direction.

Figure 11:
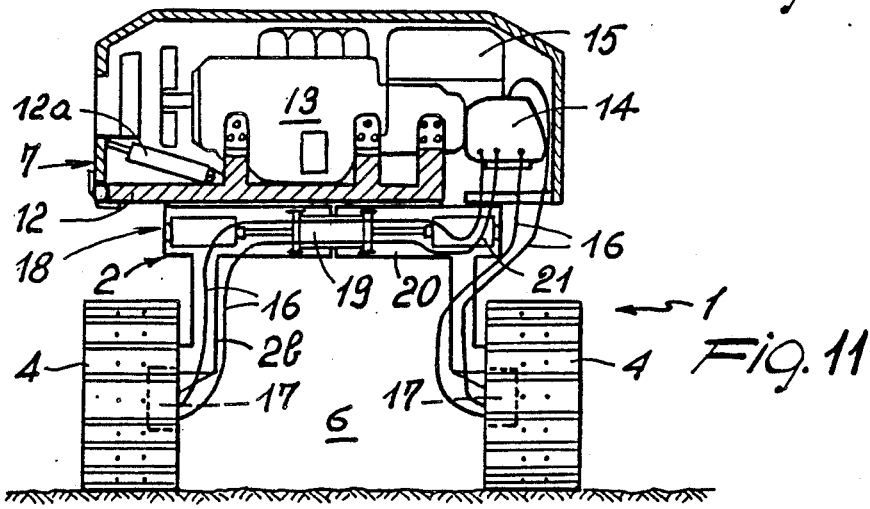
FIG. 11 shows the machine of FIG. 10 with the engine in an upper and transversal position.

Favourably, the main engine 7 includes, inside a self-bearing case 12 as can be seen from FIG. 11, a Diesel motor 13, at least a couple of fluid-operated pumps 14 driven by the Diesel motor 13, auxiliary pumps, and tanks 15 for the fluids and fuels to be used. An oil-operated cylinder able to overturn the case 12, to allow an easy maintenance, is indicated at 12a.

From each fluid-operated pump 14 flexible hoses 16 come out to lead fluid under pressure, e.g. oil under pressure, to a fluid operated motor 17 straight driving a wheel 3 of a track 4 adjacent to it. The flexible hoses 16 are long enough to allow the movement of the motor from the lower position in the channel-type hollow 6 to the upper position withou the need of disengaging and re-engaging them. The flexible hoses 16 constitute transmission members that can be adapted to the position of the main engine 7 and are able to allow its lifting and lowering, even while the agricultural machine is in movement.

Frame 2 has telescopically extensible transversal portions 18, spanning the longitudinal portions 2b, and suitable to vary the distance between the longitudinal portions 2b themselves and therefore of tracks 4, or gauge, even during the movement of the machine. A minimum value of the gauge is shown in FIGS. 3 and 5 and a maximum value is shown in FIGS. 4 and 6.

To keep substantially unchanged the elevation of the main engine 7 when the gauge is changed, each flexible cable 9 has a greater length then the maximum change in distance between the tracks 4, so as to take a vertical position (FIG. 3) or make with cylinders 8 an angle A Lower than 45° (FIG. 4).

The transversal telescopic portions 18 are of a tubular type and include a central body 19, substantially fixed, on the opposite side of which two guided sleeves 20 can slide, said sleeves being operated by a couple of fluid-operated dilating cylinders 21, included in the central body 19.

Frame 2 has a longitudinal portion 2b engaged with the sleeves 20 and the lands 10 of said guiding elements 10, 11 solidly connected to the central bodies 19.

The frame 2 is engaged through connecting means 25 with an operation and driving place 26 preferably including a cabin 26a.

The connecting means 25 are highlighted in FIG. 7a and include a fluid-operated horizontal cylinder 27, fixed relative to the frame 2, a transversal sliding guide 28, said guide being horizontally arranged and controlled by the cylinder 27, a fluid-operated vertical cylinder 30 engaged with the guide 28 and acting on the operation and driving place 27, in particular on the cabin 26a, and bearings 29 connected to the fluid-operated vertical cylinder 30 and sliding outside the cabin 26.

The horizontal fluid-operated cylinder 27 controls the transversal translation of the guide 28, and of the cabin 26 (FIG. 6).

The guide 28 is made up of two parallel cross-bars, solidly connected to each other by end stands 28a. Two brackets protrude from frame 2 to prevent said cross-bars from being deflected.

The vertical fluid-operated cylinder 30 is suitable to vertically shift the cabin 26, on one end, while the other end is connected to the swallow-tailed bearings 29, said bearings being slidable in grooves in cabin 26. Besides, the second cylinder 30 is slidably engaged on the guide 28 trough a bearing 30a.

The latter can be moved, for example by operation of a command 30b of the type driving thread/internal thread.

The dimension of the sliding transversal guide 28 of the horizontal fluid-operated cylinder 27, that controls the guide, and the sliding range of the vertical fluid-operated cylinder 30 (and therefore of the cabin 26) relative to the guide 28, are as awhole suitable to allow a shift of the cabin 26 up to an external position corresponding to the overall transversal dimension of the frame (FIG. 7a).

It is moreover advantageous, that the cabin 26a, with the relevant vertical fluid-operated cylinder 30, can be provided as hand turnable relative to the cabin 26, when it is in an external position with respect to the tracked machine, so as to direct the cabin both in the normal forward direction of the agricultural machine 1, and in the opposite direction, when the operating structure associated with the machine 1 require it.

In fact, the vertical fluid-operated cylinder 30 can turn inside a cylindrical sleeve 30c fixed to bearing 30a and the angular position can be chosen and fixed through simple block pins.

In FIGS. 5 and 6 there is shown that the frame 2 has connecting means for agricultural operating structures of various kind. The connecting means are of the kind of fixed connecting means 31a and fluid-operated connecting means 31b realized by operating cylinders that are suitable, for example, to rise or lower a front operating structure.

The main engine 7 is preferably suitable to power both the movement of the machine 1 and of the operating structure that can be associated with the frame 2 trough the fixed connecting means 31a and the fluid-operated connecting means 31b.

In FIGS. 8 and 9 the frame 2 has suspension members 22 of the fluid-operated type in which suspension fluid-operated pistons 23a control the movement of oscillable levers 23b directly engaged, at one end, with the axes of wheels 3.

The suspension members 22 allow the position of wheels 3 to be automatically adjusted to the ondulations of the ground so as to keep the wheels continuously in touch with it.

Besides, sensing means known per se allow the suspension members 22 to be controlled according to the sensed transversal slopes of the ground, thus allowing the frame 2 to self-level.

An apparatus 24, for example of the spring type, allows the longitudinal position of the axis of an end wheel 3 for each track 4 to be adjusted, so as to allow the suspension members 22 to shift to wheels 3.

In the embodiment of FIG. 9, the movement is transmitted to the track 4 by an fluid-operated motor 17 coaxial with a small fixed sprocket wheel 24a in the front or rear position opposite to the end wheel 3 tensioning the relevant track 4.

Figure 10:
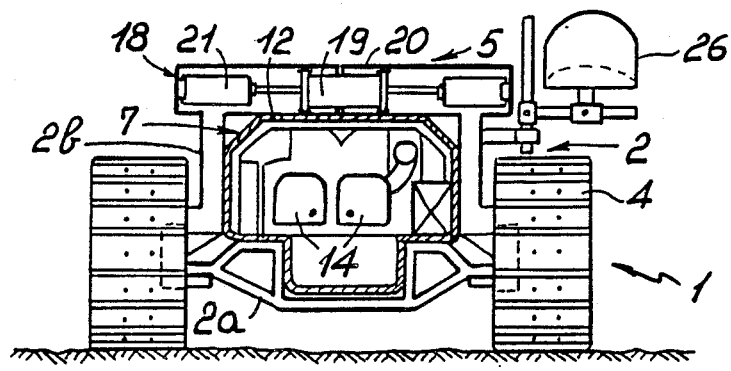
FIG. 10 shows the agricultural machine in a further embodiment with the engine in a lowered position.
Figure 12:
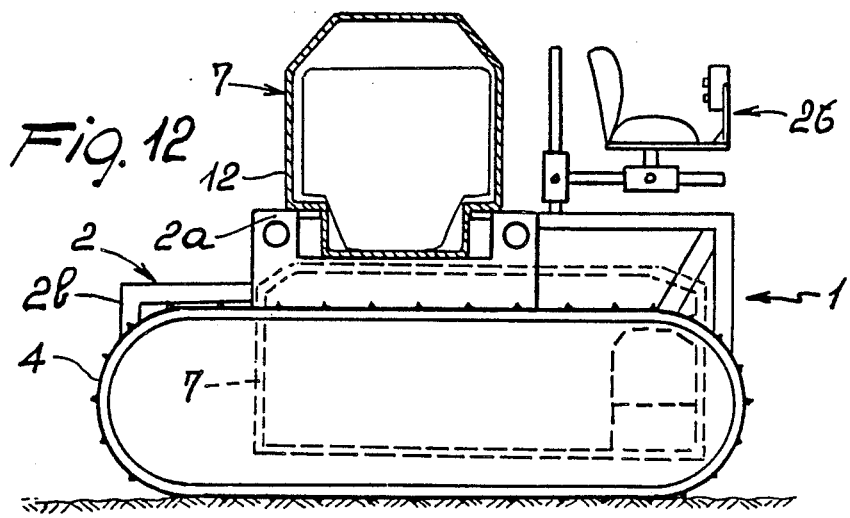
FIG. 12 shows the machine of FIG. 11 in a longitudinal view with the engine shown by a dashed line in the lower position.

A further embodiment of the agricultural machine is shown in Figures 10, 11 and 12.

It is substantially a simplified embodiment with respect to the former ones in that it does not include the fluid-operated lifting cylinders 8. The movement of the main engine 7, from the lower position shown in FIG. 10 to the upper position shown in FIG. 11, must therefore be carried out by lifting means external to the agricultural machine 1. Favourably the main engine 7 is directly associated to the holding plane 5 in transversal position, so that a free portion of it can be made available.

The agricultural machine 1 operates as follows. By operating the fluid-operated lifting cylinders 8 the main engine 7 can be easily moved, even during the movement of the machine 1, from the lower position to the upper position, according to the need. Therefore, the possibility exist of performing a wide range of different operations, according to the lay-out of the machine 1. For example, operations that require a limited height and a low and free holding plane 5, to place on it various agricultural equipments, are possible, as well as operations that require, on the contrary, a large remarkable height relative to the ground to allow the machine to ride over some cultures, especially of the horticultural type.

The height on the ground is also useful to allow the passage through the channel-type hollow 6 of suitable carrying or conveying devices of limited height, used for the first conveying of horticultural products as soon as they are collected from the ground, on the front side of the machine.

Moreover, the agricultural machine according to the invention is not limited in its operation by the peculiarities of the ground or of the culture, because the gauge can be changed at will and cabin 26a can be placed in a position at pleasure.

In fact is possible to change, even during the movement, the gauge between the tracks 4 by operating the fluid-operated dilating cylinders 21, and still during the movement the operation and driving place 26 can be positioned at the most suitable elevation even out of shape of the machine 1, so as to allow a visual check of every point of the ground or of every agricultural operation.

The suspension members 22 keep the machine always in level position, regardless of the slope of the ground.

It is pointed out that the possibility of transfer of the main engine 7 in the two different shown elevations is made easy by the fact that it is a solid equipment, integrally contained in the case 12, from which the flexible hoses 16 of the driving fluid exit, the hoses being connected to fluid-operated motors 17.

The flexible hoses 16 not only allow the movement of the main engine 7 without the need of intervention on connecting joints or similar devices, but also allow a change in the spacing between the tracks 4 according to the needs resulting from the crop.

It is also pointed out that the dilating of the gauge turns out to be possible the fact notwithstanding that the fluid-operated lifting cylinders 8 are positioned along the longitudinal portion 2b of the frame 2, said positioning being besides useful in that the fluid-operated lifting cylinders themselves 8 are place out of the channel-type hollow 6. In fact, due to the flexible cables 9, the cylinders 8 can be moved without changing in a considerable manner the position of the main engine 7.

I claim:

1. Multipurpose and self-moving agricultural machine, comprising:

mobile bearing members (3, 4), defining a direction of movement of said machine, a frame (2) borne by said mobile bearing members (3, 4) and having a transversal direction, extending transversally to said direction of movement, and a longitudinal direction perpendicular to said transversal direction, a main engine (7) borne by said frame (2) and acting at least on said mobile bearing members (3, 4), a plurality of engaging means (31a, 31b) provided on that frame (2) and suitable to engage operative structures for agricultural works, and an operation and driving place (26) borne by said frame (2);

characterized in that said frame (2) includes engagement means (2a) suitable to bear said main engine (7) alternatively in an upper position, said upper position being substantially above said frame (2), and in a lower position, said lower position being substantially beside said mobile bearing members (3, 4), driving members (16) being provided between said main engine (7) and said mobile bearing members (3, 4), said driving members being adaptable for both said upper and lower positions of said main engine (7).

2. Agricultural machine according to claim 1, in which said engagement means (2a) include fluid-operated lifting cylinders (8) suitable to translate said main engine (7) upon control between said upper and lower positions.

3. Agricultural machine according to claim 1, in which said driving members (16) consist of flexible hoses, and in which at least one fluid-operated motor (17) is provided, said motor being powered by said main engine (7) trough said flexible hoses (16) and engaged with said mobile bearing members (3, 4).

4. Agricultural machine according to claim 1, in which said frame (2) defines in a lower part a channel-type hollow (6) suitable for housing said main engine (7) in said lower position and extending parallel to said longitudinal direction, between said bearing mobile members (3, 4).

5. Agricultural machine according to claim 4, in which said frame (2) defines in an upper part a holding plane (5) placed above said mobile bearing members (3, 4), and in which said main engine (7) in said upper position is placed substantially above said holding plane (5).

6. Agricultural machine according to claim 4, in which said frame (2) has longitudinal portions (2b) substantially parallel to said longitudinal direction and engaged with said mobile bearing members (3, 4), and in which said engagement means (2a) are provided on said longitudinal portions (2b) of said frame (2), beside said channel-type hollow (6).

7. Agricultural machine according to claim 6, in which said frame (2) comprises transversal portions (18), said portions being telescopically extendable and spanning said longitudinal portions (2b), and suitable to change the distance between said longitudinal portions (2b).

8. Agricultural machine according to claim 7, in which said transversal telescopic portions (18) are of a tubular type, and in which fluid-operated dilating cylinders are provided (21), said cylinders being inserted inside said transversal telescopic portions (18), said fluid-operated dilating cylinders (21) controlling the movement of said longitudinal portions (2b) approaching to and removing from each other.

9. Agricultural machine according to claim 7, in which said engagement means (2a) include fluid-operated lifting cylinders (8) suitable, when so operated, to translate said main engine (7) between said upper and lower positions, said fluid-operated lifting cylinders (8) rising up to an elevation equal to or lower than a maximum elevation of said main engine (7), and flexible cables (9) connecting said fluid-operated lifting cylinders (8) to said main engine (7), each of them having a length greater than the maximum change in distance between said mobile bearing members (3, 4).

10. Agricultural machine according to claim 7, in which said telescopic transversal portions (18) of said frame (2) have central bodies (19) in a fixed position, and in which guiding members (10, 11) are provided to guide the movements of said main engine (7) between said upper and lower positions, said members being formed in correspondence with said central bodies (19) in a fixed position.

11. Agricultural machine according to claim 10, in which said guiding members (10, 11) include lands (10) and grooves (11), the grooves being of reciprocal shape with respect to said lands (10) and extending substantially in a vertical direction, said guide members being formed between said central bodies (19) having a fixed position and said main engine (7).

12. Agricultural machine according to claim 4, in which said frame (2) includes suspension members (22) having fluid-operated suspension pistons (23a) engaging oscillable levers (23b) directly connected with said mobile bearing members (3, 4), and in which sensing means are provided, known per se, suitable to sense the tilt of said frame (2) relative to an horizontal plane and to selectively control said suspension members (22).

13. Agricultural machine according to claim 4, in which said frame (2) includes connecting means (25) suitable to support said operation and driving place (26), said connecting means comprising: a transversal slide guide (28), said guide being mobile parallel to said transversal direction, an horizontal fluid-operated cylinder (27) engaged between said frame (2) and said guide (28), and a vertical fluid-operated cylinder (30), engaged between saidi guide (28) and said operation and driving place (26).

14. Agricultural machine according to claim 13, in which a bearing (30a) is provided between said guide (28) and said vertical fluid-operated cylinder (30), the bearing being positionable along said guide (28).

15. Agricultural machine according to claim 14, in which a cylindrical sleeve (30c) is provided between said bearing (30a) and said vertical fluid-operated cylinder (30), said sleeve acting as a swivel joint between the same bearing (30a) and vertical fluid-operated cylinder (30).

* * * * *